Patented Apr. 7, 1942

2,279,200

UNITED STATES PATENT OFFICE 2,279,200

FERTILIZER MANUFACTURE

Frank G. Keenen, Swarthmore, Pa., assignor to E. I. du Pont de Nemours & Company, Wilmington, Del., a corporation of Delaware No Drawing. Application February 17, 1940, Serial No. 319,464

11 Claims. (Cl. 71—29)

This invention relates to fertilizers and more particularly to the production of improved nitrogen-carrying fertilizer materials.

It is well known that nitrogen is one of the elements required for satisfactory plant growth and that the presence of nitrogen is, therefore, necessary in a complete fertilizer mixture.

It is common practice in the fertilizer industry to treat acidic fertilizer materials, especially those comprising largely mono-calcium phosphate, such as superphosphate or triple superphosphate, with free ammonia to improve their physical condition and to fix the otherwise non-usable ammonia as an ammonium salt of the acid present. The free ammonia heretofore utilized has been employed in the form of gaseous ammonia, anhydrous ammonia, and various aqueous solutions containing free ammonia alone or in conjunction with other nitrogen compounds such as urea, ammonium salts of inorganic acids, and inorganic nitrates.

This practice has the disadvantage, however, that absorption of the free ammonia so added has resulted in substantial increase in temperature of the treated materials leading to losses of available $P_2O_5$, undesirable setting on cooling, decomposition of urea, and similar disadvantages due to rise in temperature. Additionally, a further disadvantage of the prior processes has been the fact that the nitrogen obtained after treatment with free ammonia has been entirely water-soluble and because of this a substantial portion may be removed from the soil before utilization by growing vegetation.

It is an object of this invention to provide a new and improved process for the ammoniation of acidic fertilizer materials in such a way as to avoid the heat disadvantages of the prior art.

It is an additional object of the present invention to provide a process for the preparation of fertilizer materials containing nitrogen compounds not readily soluble in water and in a form such that the nitrogen thereof becomes available to plants gradually and over a relatively extended period of time.

Other objects and advantages of this invention will be apparent from the following specification in which its preferred details and embodiments are described.

According to this invention, hexamethylene tetramine is utilized as a non-exothermic source of ammonia for neutralizing the excess acidity of and to condition mixtures of acidic fertilizer materials and urea and at the same time to convert a substantial portion of the nitrogen compounds present to a relatively water-insoluble form. The possibility of ammoniating an acidic fertilizer mixture without a substantial temperature rise has not existed with the nitrifying agents heretofore disclosed and, furthermore, the simultaneous conversion of the nitrogen in mixtures of acidic phosphates and urea to relatively insoluble forms has not heretofore been suggested.

The terms "urea" or "a urea," as used herein, refer to urea as such or derivatives of urea and compounds which, in contact with acidic fertilizer materials, are converted to urea such as calcium cyanamide.

The hexamethylene tetramine may, according to this invention, be added alone, before, during or after addition of other materials in preparing a fertilizer. Similarly, the hexamethylene tetramine, being a crystalline, water-soluble compound containing 40% nitrogen, may be easily added to acidic fertilizer materials containing urea, or it may be first mixed with the desired quantities of urea and thereafter added to acidic fertilizer materials, or in either of the above two cases, it may be added to or substituted for ingredients of ammoniating solutions, generally, such, for example, as the ammoniating or nitrifying solutions described in U. S. Patent 1,894,136, which contain both inorganic and organic ammonia. Again, proceeding according to this invention, hexamethylene tetramine may be added to a phosphatic material in the presence of urea, either before, after, or during addition of other materials, such, for example, as potash salts, including potassium sulfate, chloride, and nitrate; ammonium salts such as ammonium chloride, nitrate, sulfate, carbamate, mono- and di-ammonium phosphates, or the like; and then the product obtained may be further ammoniated by use of commercial aqua or anhydrous ammonia. Or, alternatively, the mixture of urea and phosphatic material may be first ammoniated, somewhat at least, by use of ammonia as above described and thereafter hexamethylene tetramine added to the ammoniated product; or the hexamethylene tetramine may be added during such ammoniation with ammonia or like nitrogen-containing material while, at the same time, after or before, other materials such as above described may be added as are desired to obtain a finished fertilizer.

As a further feature of the present invention, hexamethylene tetramine may be applied to acidic fertilizer materials in the form of an aqueous solution which may or may not contain free ammonia in addition to that released by hexamethylene tetramine. Upon addition of these solutions to acidic fertilizer materials containing urea or urea-forming substances such as calcium cyanamid there is produced a nitrogenous fertilizer containing water-soluble, as well as a substantial amount of relatively water-insoluble organic nitrogen.

In addition of hexamethylene tetramine to acidic fertilizer materials, I have found that the hydrogen ion concentration or pH of the fertilizer materials should fall within a pH of 2 to 5 with a preferred pH region between 3.5 and 4.5. Within these ranges the hexamethylene tetramine will release its nitrogen as free ammonia, which is immediately absorbed by the acid phosphate compounds. Simultaneously, within these pH ranges the urea, or urea-forming substances, present are converted to relatively water-insoluble compounds. There should, preferably, be approximately 6 moles of urea per mole of hexamethylene tetramine, although this ratio may be varied from about 3 to about 10 moles of urea per mole of hexamethylene tetramine.

The following examples will illustrate the practice of this invention, although the invention is not limited to the examples.

Example 1

With a mixture of 1627 pounds of commercial superphosphate (20 $P_2O_5$) and 273 pounds of urea, there was slowly mixed, in a conventional mixing drum 100 pounds of hexamethylene tetramine. There resulted a fertilizer base of satisfactory physical appearance containing 16% $P_2O_5$, 6% water-insoluble and 2% water-soluble nitrogen. The resulting base can be used for admixture with other fertilizer materials such as potash salts and the like.

Example 2

To 1830 pounds of commercial superphosphate, such as described in Example 1, there was added, in a mixing drum, 148 pounds of an ammoniating solution containing 43% urea, 30% ammonia, and 27% water. After ammoniation there was added, in the mixing drum, 22 pounds of solid hexamethylene tetramine. The product resulting contained 1.25% insoluble nitrogen and 2.50% soluble nitrogen with 18% $P_2O_5$. Although in carrying out this example the hexamethylene tetramine was added after ammoniation by use of an ammoniating solution, it should be understood that this invention may be practiced by the addition of the hexamethylene tetramine before or together with the ammoniating solution.

Example 3

Similarly to the procedure of Example 2, there was mixed with 900 pounds of commercial superphosphate 8½ pounds hexamethylene tetramine, 65 pounds sodium nitrate, 100 pounds ammonium sulfate, 100 pounds potassium chloride, 200 pounds limestone and 569 pounds of sand. After inter-mixture of these materials, there was added to the resulting product 58 parts by weight of a solution containing 43% urea, 30% ammonia and 27% water. The resulting mixture was a complete fertilizer of desirable physical characteristics. Although sand has been described as the filler, other filling materials such as dolomite, and the like may be utilized.

Example 4

In a manner similar to that described in Example 3, there was mixed together with 900 pounds of commercial superphosphate, 8½ pounds of hexamethylene tetramine, 45 pounds calcium cyanamide, 230 pounds ammonium sulfate, 100 pounds potassium chloride, 300 pounds limestone and 417 pounds of sand. These materials were thoroughly mixed in a conventional mixing drum to give as a resultant product a complete fertilizer of desirable physical characteristics, containing water-soluble as well as water-insoluble nitrogen.

Various changes may be made in the compositions hereinbefore described, as well as in the method for preparing and embodying the same, without departing from the invention or sacrificing any of the advantages thereof.

I claim:

1. A process of ammoniating acidic fertilizer materials which comprises incorporating hexamethylene tetramine with acidic fertilizer materials in the presence of urea.

2. A process of ammoniating fertilizer materials which comprises incorporating hexamethylene tetramine with superphosphate in the presence of urea.

3. The process of ammoniating acidic fertilizer materials which comprises incorporating hexamethylene tetramine with an acidic fertilizer material in the presence of urea, a fertilizer material having a hydrogen ion concentration of in the range of pH=2 to pH=5.

4. A process of ammoniating fertilizer materials which comprises incorporating hexamethylene tetramine with a superphosphate in the presence of urea, the phosphate having the hydrogen ion concentration within the range of pH=2 to pH=5.

5. A process for the production of a fertilizer containing relatively water-insoluble organic nitrogen which comprises incorporating an aqueous solution of hexamethylene tetramine with an acidic fertilizer material in the presence of urea.

6. A process for the production of a fertilizer containing relatively water-insoluble organic nitrogen which comprises incorporating an aqueous solution of hexamethylene tetramine with an acidic fertilizer material in the presence of urea, the hexamethylene tetramine being added to the extent of at least 1 mole of hexamethylene tetramine per 10 moles of urea.

7. A process of ammoniating acidic fertilizer materials which comprises incorporating hexamethylene tetramine with acidic fertilizer materials in the presence of urea, the ratio of hexamethylene tetramine added falling within the range of from 3 to about 10 moles of urea per mole of hexamethylene tetramine.

8. In a process for ammoniating acidic fertilizer materials containing urea, the step which comprises neutralizing the excess acidity of such materials with hexamethylenetetramine.

9. In a process for ammoniating superphosphate containing urea, the step which comprises neutralizing the excess acidity of such materials with hexamethylenetetramine.

10. In a process for ammoniating acidic fertilizer materials containing urea, the step which comprises neutralizing the excess acidity of such materials with hexamethylenetetramine, the acidic fertilizer material having a hydrogen ion concentration in the range of pH=2 to pH=5.

11. In a process for ammoniating superphosphate in the presence of urea, the step which comprises neutralizing the excess acidity of such materials with hexamethylenetetramine, the superphosphate having a hydrogen ion concentration within the range of pH=2 to pH=5.

FRANK G. KEENEN.